US011907059B2

(12) United States Patent
Tan

(10) Patent No.: US 11,907,059 B2
(45) Date of Patent: Feb. 20, 2024

(54) ABNORMAL POWER LOSS RECOVERY METHOD, MEMORY CONTROL CIRCUIT UNIT, AND MEMORY STORAGE DEVICE

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 85 days.

(21) Appl. No.: 17/715,050

(22) Filed: Apr. 7, 2022

(65) Prior Publication Data
US 2023/0297464 A1 Sep. 21, 2023

(30) Foreign Application Priority Data
Mar. 18, 2022 (TW) .................................. 111110110

(51) Int. Cl.
*G06F 11/07* (2006.01)
*G06F 1/30* (2006.01)
*G06F 3/06* (2006.01)

(52) U.S. Cl.
CPC ............ *G06F 11/0793* (2013.01); *G06F 1/30* (2013.01); *G06F 3/065* (2013.01); *G06F 3/0619* (2013.01); *G06F 3/0625* (2013.01); *G06F 3/0689* (2013.01); *G06F 11/073* (2013.01)

(58) Field of Classification Search
CPC .. G06F 11/0793; G06F 11/073; G06F 3/0619; G06F 3/0625; G06F 3/065; G06F 3/0689; G06F 1/30
See application file for complete search history.

(56) References Cited

U.S. PATENT DOCUMENTS

| 2015/0106556 | A1* | 4/2015 | Yu ....................... G06F 12/0246 711/103 |
| 2020/0264954 | A1* | 8/2020 | Belgaied ............... G06F 3/0619 |
| 2021/0081132 | A1* | 3/2021 | Smith ................... G06F 3/0679 |
| 2022/0129055 | A1* | 4/2022 | Yang ........................ G06F 1/30 |

FOREIGN PATENT DOCUMENTS

TW  I655640  4/2019

OTHER PUBLICATIONS

"Office Action of Taiwan Counterpart Application", dated Jan. 18, 2023, p. 1-p. 5.

* cited by examiner

*Primary Examiner* — Jigar P Patel
(74) *Attorney, Agent, or Firm* — JCIPRNET

(57) ABSTRACT

An abnormal power loss recovery method, a memory control circuit unit, and a memory storage device are provided. The method is configured for a memory storage device including a rewritable non-volatile memory module having a plurality of super-physical units. The super-physical units include at least two physical erasing units, and each of the physical erasing units belongs to a different operation unit and includes a plurality of physical programming units. The method includes: reading data stored in a first super-physical unit without a corresponding RAID ECC code when a memory storage device is powered on again and detected as an abnormal power loss to obtain first data, and the first super-physical unit is a last super-physical unit to which data is written before the abnormal power loss occurs; and copying the first data to a second super-physical unit.

27 Claims, 10 Drawing Sheets

| | PL(1) | PL(2) | PL(3) | PL(4) | PL(5) | PL(6) | PL(7) | PL(8) |
|---|---|---|---|---|---|---|---|---|
| 701(0)~708(0) | D0 | D1 | D2 | D3 | D4 | D5 | D6 | D7 |
| 701(1)~708(1) | D8 | D9 | D10 | D11 | D12 | D13 | P0 | P1 |
| 701(2)~708(2) | | | | | | | | |
| 701(3)~708(3) | | | | | | | | |
| 701(4)~708(4) | | | | | | | | |
| 701(5)~708(5) | | | | | | | | |
| 701(M)~708(M) | ... | ... | ... | ... | ... | ... | ... | ... |

FIG. 8

| | PL(1) | PL(2) | PL(3) | PL(4) | PL(5) | PL(6) | PL(7) | PL(8) |
|---|---|---|---|---|---|---|---|---|
| 701(0)~708(0) | D0 | D1 | D2 | D3 | D4 | D5 | D6 | D7 |
| 701(1)~708(1) | D8 | D9 | D10 | D11 | D12 | D13 | P0 | P1 |
| 701(2)~708(2) | D14 | D15 | D16 | D17 | | | | |
| 701(3)~708(3) | | | | | | | | |
| 701(4)~708(4) | | | | | | | | |
| 701(5)~708(5) | | | | | | | | |
| 701(M)~708(M) | ... | ... | ... | ... | ... | ... | ... | ... |

FIG. 9

ABNORMAL POWER LOSS RECOVERY METHOD, MEMORY CONTROL CIRCUIT UNIT, AND MEMORY STORAGE DEVICE

CROSS-REFERENCE TO RELATED APPLICATION

This application claims the priority benefit of Taiwan application serial no. 111110110, filed on Mar. 18, 2022. The entirety of the above-mentioned patent application is hereby incorporated by reference herein and made a part of this specification.

BACKGROUND OF THE INVENTION

Field of the Invention

The invention relates to a data storage technique, and more particularly, to an abnormal power loss recovery method, a memory control circuit unit, and a memory storage device.

Description of Related Art

The growth of digital cameras, mobile phones, and MP3 players has been rapid in recent years. Consequently, the consumers' demand for storage media has increased tremendously. Since the rewritable non-volatile memory (such as flash memory) has characteristics such as data non-volatility, power-saving, small size, lack of mechanical structure, and fast reading speed, the rewritable non-volatile memory is most suitable for electronic products such as notebook computers. A solid-state disc is a memory storage device adopting flash memory as storage medium. Therefore, the flash memory industry has become a relatively import part in the electronic industry in recent years.

With the advancement of technology, one super-physical erasing unit is configured to include an increasing number of physical programming units, and the number of physical programming units included in a single super-physical erasing unit is even increased to more than 3000. Therefore, in the case of sudden power-off recovery (SPOR), it takes a long time to process the suddenly interrupted operation and manage the physical units. This results in an increase in time for power loss recovery and reduced device restart efficiency.

SUMMARY OF THE INVENTION

The invention provides an abnormal power loss recovery method, a memory control circuit unit, and a memory storage device that may reduce the recovery time of abnormal power loss and improve the operation efficiency of the memory storage device.

An exemplary embodiment of the invention provides an abnormal power loss recovery method configured for a memory storage device including a rewritable non-volatile memory module. The rewritable non-volatile memory module includes a plurality of super-physical units, the super-physical units include at least two physical erasing units, and the at least two physical erasing units belong to different operation units and each of the physical erasing units includes a plurality of physical programming units. The abnormal power loss recovery method includes: reading data stored in a first super-physical unit without a corresponding RAID ECC code when a memory storage device is powered on again and detected as an abnormal power loss to obtain first data, wherein the first super-physical unit is a last super-physical unit to which data is written before the abnormal power loss occurs; and copying the first data to a second super-physical unit.

In an exemplary embodiment of the invention, before the step of reading the data stored in the first super-physical unit without the corresponding RAID ECC code to obtain the first data, the method further includes: scanning the first super-physical unit to obtain an amount of written data of the first super-physical unit when the memory storage device is powered on again and detected as the abnormal power loss; determining whether the amount of written data is greater than a first threshold value; obtaining the first data and copying the first data to the second super-physical unit in response to the amount of written data being greater than the first threshold value; and reading all data stored in the first super-physical unit to obtain second data and copying the second data to the second super-physical unit in response to the amount of written data not being greater than the first threshold value.

In an exemplary embodiment of the invention, the first threshold value is determined according to a capacity of the first super-physical unit.

In an exemplary embodiment of the invention, the first threshold value is ⅓ of a capacity of the first super-physical unit.

In an exemplary embodiment of the invention, after the step of copying the first data to the second super-physical unit, the method further includes: receiving a write command from the host system and writing data indicated by the write command to the second super-physical unit following the first data.

In an exemplary embodiment of the invention, after the step of copying the first data to the second super-physical unit, the method further includes: determining whether an idle time elapsed from a last writing to a present in the plurality of super-physical units is greater than a predetermined time; and reading data other than the first data in the first super-physical unit to obtain third data and copying the third data to a third super-physical unit in response to the idle time being greater than the predetermined time.

In an exemplary embodiment of the invention, the method further includes: determining that the first super-physical unit is a first type physical unit or a second type physical unit; reading the first data and copying the first data to the second super-physical unit in response to the first super-physical unit being the first type physical unit; and not copying data stored in the first super-physical unit in response to the second super-physical unit being the second type physical unit.

In an exemplary embodiment of the invention, a first total number of physical programming units in an erased state in the first type physical unit is different from a second total number of physical programming units in the erased state in the second type physical unit.

In an exemplary embodiment of the invention, the first total number is not zero, and the second total number is zero.

An exemplary embodiment of the invention provides a memory control circuit unit configured to control a memory storage device. The memory storage device includes a rewritable non-volatile memory module. The memory control circuit unit includes a host interface, a memory interface, and a memory management circuit. The host interface is configured to be coupled to a host system. The memory interface is configured to be coupled to the rewritable non-volatile memory module, wherein the rewritable non-volatile memory module includes a plurality of super-physical units, the super-physical units include at least two physical erasing units, and the at least two physical erasing units belong to different operation units and each of the physical erasing units includes a plurality of physical programming units. The memory management circuit is coupled to the host interface and the memory interface. The memory management circuit is further configured to read data stored in a first super-physical unit without a corresponding RAID ECC code when the memory storage device is powered on again and detected as an abnormal power loss to obtain first data. The first super-physical unit is a last super-physical unit to which data is written before the abnormal power loss occurs. Moreover, the memory management circuit is further configured to copy the first data to a second super-physical unit.

In an exemplary embodiment of the invention, before the operation of reading the data stored in the first super-physical unit without the corresponding RAID ECC code to obtain the first data, the memory management circuit is further configured to: scan the first super-physical unit to obtain an amount of written data of the first super-physical unit when the memory storage device is powered on again and detected as the abnormal power loss; determine whether the amount of written data is greater than a first threshold value; obtain the first data and copy the first data to the second super-physical unit in response to the amount of written data being greater than the first threshold value; and read all data stored in the first super-physical unit to obtain second data, and copy the second data to the second super-physical unit in response to the amount of written data not being greater than the first threshold value.

In an exemplary embodiment of the invention, the first threshold value is determined according to a capacity of the first super-physical unit.

In an exemplary embodiment of the invention, the first threshold value is ⅓ of a capacity of the first super-physical unit.

In an exemplary embodiment of the invention, after the operation of copying the first data to the second super-physical unit, the memory management circuit is further configured to receive a write command from the host system and write data indicated by the write command to the second super-physical unit following the first data.

In an exemplary embodiment of the invention, after the operation of copying the first data to the second super-physical unit, the memory management circuit is further configured to determine whether an idle time elapsed from a last writing to a present in the plurality of super-physical units is greater than a predetermined time. Moreover, the memory management circuit is further configured to read data other than the first data in the first super-physical unit to obtain third data and copy the third data to a third super-physical unit in response to the idle time being greater than the predetermined time.

In an exemplary embodiment of the invention, the memory management circuit is further configured to determine whether the first super-physical unit is a first type physical unit or a second type physical unit. The memory management circuit is further configured to read the first data and copy the first data to the second super-physical unit in response to the first super-physical unit being the first type physical unit. Moreover, the memory management circuit is further configured to not copy data stored in the first super-physical unit in response to the second super-physical unit being the second type physical unit.

In an exemplary embodiment of the invention, a first total number of physical programming units in an erased state in the first type physical unit is different from a second total number of physical programming units in the erased state in the second type physical unit.

In an exemplary embodiment of the invention, the first total number is not zero, and the second total number is zero.

An exemplary embodiment of the invention provides a memory storage device including a connection interface unit, a rewritable non-volatile memory module, and a memory control circuit unit. The connection interface unit is configured to be coupled to a host system. The rewritable non-volatile memory module includes a plurality of super-physical units, the super-physical units include at least two physical erasing units, and the at least two physical erasing units belong to different operation units and each of the physical erasing units includes a plurality of physical programming units. The memory control circuit unit is coupled to the connection interface unit and the rewritable non-volatile memory module. The memory control circuit unit is further configured to read data stored in a first super-physical unit without a corresponding RAID ECC code when the memory storage device is powered on again and detected as an abnormal power loss to obtain first data. The first super-physical unit is a last super-physical unit to which data is written before the abnormal power loss occurs. Moreover, the memory control circuit unit is further configured to copy the first data to a second super-physical unit.

In an exemplary embodiment of the invention, before the operation of reading the data stored in the first super-physical unit without the corresponding RAID ECC code to obtain the first data, the memory control circuit unit is further configured to: scan the first super-physical unit to obtain an amount of written data of the first super-physical unit when the memory storage device is powered on again and detected as the abnormal power loss; determine whether the amount of written data is greater than a first threshold value; obtain the first data and copy the first data to the second super-physical unit in response to the amount of written data being greater than the first threshold value; and read all data stored in the first super-physical unit to obtain second data, and copy the second data to the second super-physical unit in response to the amount of written data not being greater than the first threshold value.

In an exemplary embodiment of the invention, the first threshold value is determined according to a capacity of the first super-physical unit.

In an exemplary embodiment of the invention, the first threshold value is ⅓ of a capacity of the first super-physical unit.

In an exemplary embodiment of the invention, after the operation of copying the first data to the second super-physical unit, the memory control circuit unit is further configured to receive a write command from the host system and write data indicated by the write command to the second super-physical unit following the first data.

In an exemplary embodiment of the invention, after the operation of copying the first data to the second super-physical unit, the memory control circuit unit is further configured to determine whether an idle time elapsed from a last writing to a present in the plurality of super-physical units is greater than a predetermined time. Moreover, the memory control circuit unit is further configured to read data other than the first data in the first super-physical unit to obtain third data and copy the third data to a third super-physical unit in response to the idle time being greater than the predetermined time.

In an exemplary embodiment of the invention, the memory control circuit unit is further configured to determine whether the first super-physical unit is a first type physical unit or a second type physical unit. The memory control circuit unit is further configured to read the first data and copy the first data to the second super-physical unit in response to the first super-physical unit being the first type physical unit. Moreover, the memory control circuit unit is further configured to not copy data stored in the first super-physical unit in response to the second super-physical unit being the second type physical unit.

In an exemplary embodiment of the invention, a first total number of physical programming units in an erased state in the first type physical unit is different from a second total number of physical programming units in the erased state in the second type physical unit.

In an exemplary embodiment of the invention, the first total number is not zero, and the second total number is zero.

Based on the above, in the abnormal power loss recovery method, the memory control circuit unit, and the memory storage device provided by the embodiments of the invention, in the case of an increasing number of physical programming units included in the super-physical unit, all or a portion of the data of the super-physical unit may be copied to another super-physical unit according to the characteristics of the super-physical unit when the power is turned off abnormally and then turned back on again. Thereby, the recovery time of abnormal power loss may be effectively reduced, and the operation efficiency of the memory storage device may be improved.

In order to make the aforementioned features and advantages of the disclosure more comprehensible, embodiments accompanied with figures are described in detail below.

BRIEF DESCRIPTION OF THE DRAWINGS

FIG. 8 is a schematic diagram of data writing shown according to an exemplary embodiment of the invention.

FIG. 9 is a schematic diagram of data writing shown according to an exemplary embodiment of the invention.

DESCRIPTION OF THE EMBODIMENTS

In general, a memory storage device (also referred to as a memory storage system) includes a rewritable non-volatile memory module and a controller (also referred to as a control circuit unit). The memory storage device is generally used with a host system, such that the host system may write data to the memory storage device or read data from the memory storage device.

Figure 1:
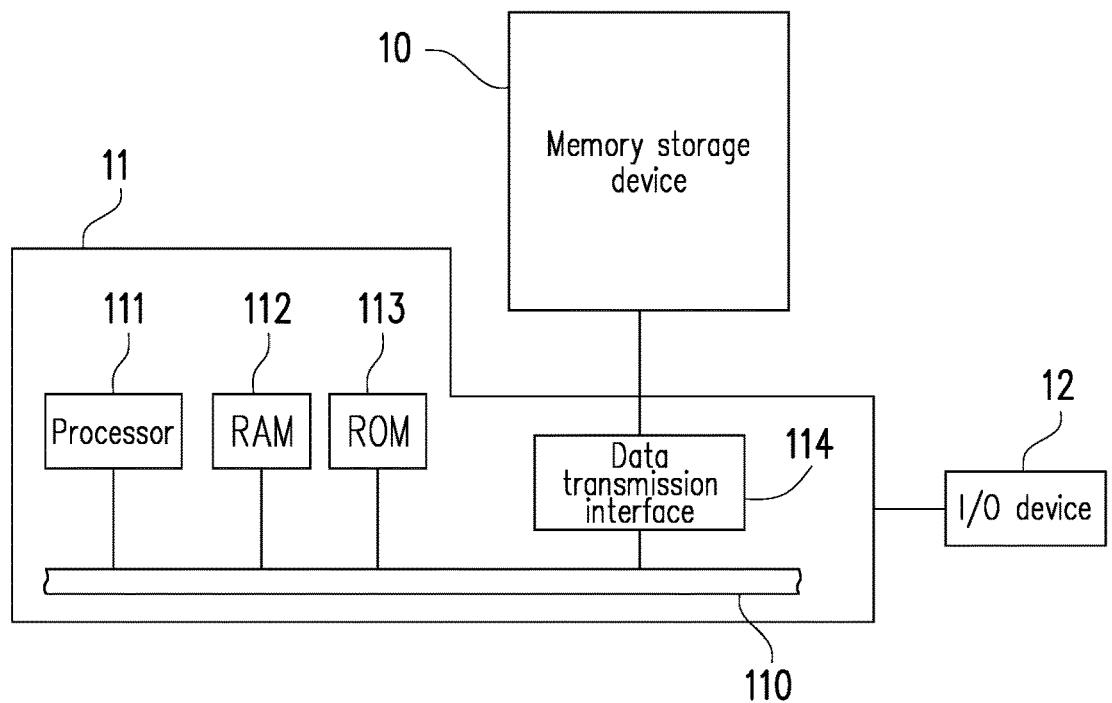
FIG. 1 is a diagram of a host system, a memory storage device, and an input/output (I/O) device shown according to an exemplary embodiment.

FIG. 1 is a diagram of a host system, a memory storage device, and an input/output (I/O) device shown according to an exemplary embodiment. Moreover, FIG. 2 is a diagram of a host system, a memory storage device, and an input/output (I/O) device shown according to another exemplary embodiment.

Figure 2:
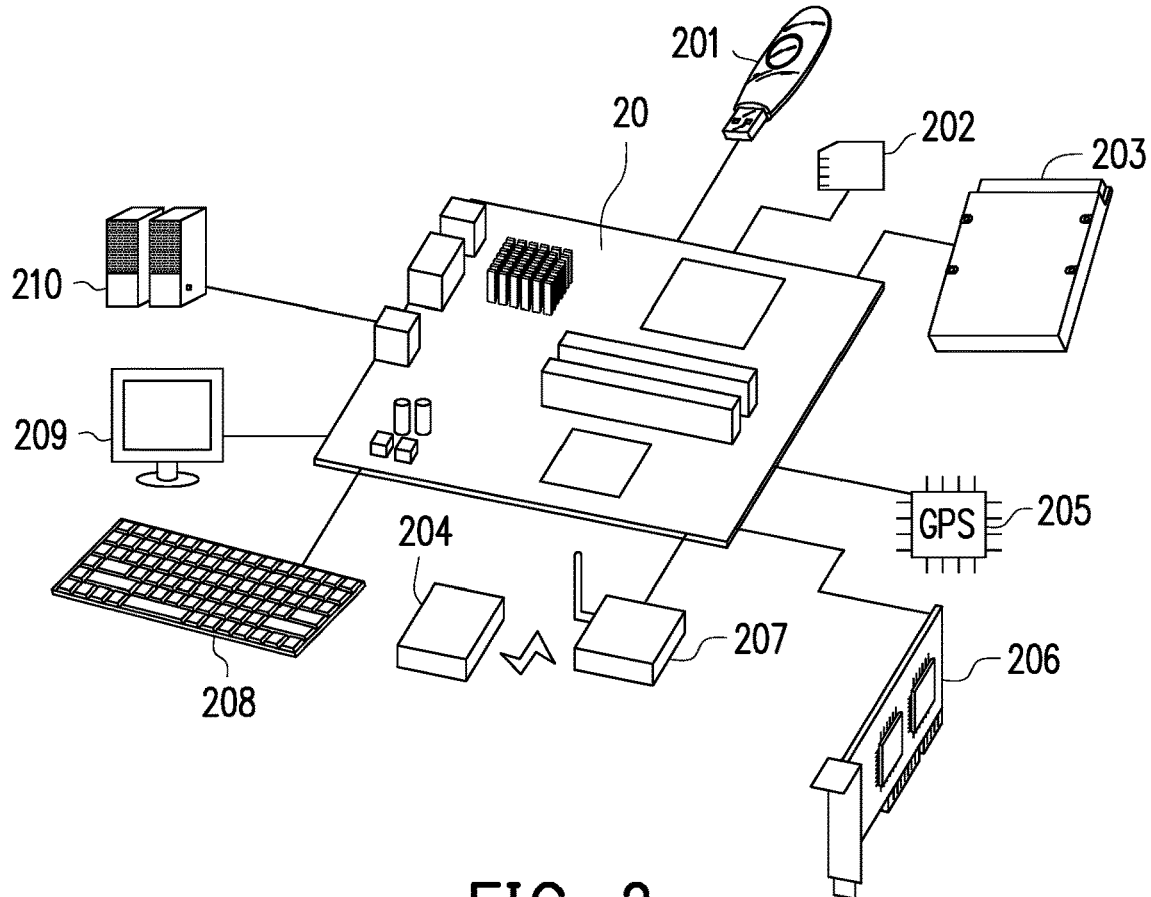
FIG. 2 is a diagram of a host system, a memory storage device, and an I/O device shown according to another exemplary embodiment.

Referring to FIG. 1 and FIG. 2, a host system 11 generally includes a processor 111, a random-access memory (RAM) 112, a read-only memory (ROM) 113, and a data transmission interface 114. The processor 111, the RAM 112, the ROM 113, and the data transmission interface 114 are all coupled to a system bus 110.

In the present exemplary embodiment, the host system 11 is coupled to the memory storage device 10 via the data transmission interface 114. For example, the host system 11 may write data to the memory storage device 10 via the data transmission interface 114 or read data from the memory storage device 10. Moreover, the host system 11 is coupled to the I/O device 12 via the system bus 110. For example, the host system 11 may send an output signal to the I/O device 12 or receive an input signal from the I/O device 12 via the system bus 110.

In the present exemplary embodiment, the processor 111, the RAM 112, the ROM 113, and the data transmission interface 114 may be disposed on a motherboard 20 of the host system 11. The quantity of the data transmission interface 114 may be one or a plurality. The motherboard 20 may be coupled to the memory storage device 10 in a wired or wireless method via the data transmission interface 114. The memory storage device 10 may be, for example, a flash drive 201, a memory card 202, a solid-state drive (SSD) 203, or a wireless memory storage device 204. The wireless memory storage device 204 may be, for example, a memory storage device based on various wireless communication techniques such as a near-field communication (NFC) memory storage device, a wireless fax (WiFi) memory storage device, a Bluetooth memory storage device, or a low-power Bluetooth memory storage device (such as iBeacon). Moreover, the motherboard 20 may also be coupled to various I/O devices such as a global positioning system (GPS) module 205, a network interface card 206, a wireless transmission device 207, a keyboard 208, a screen 209, or a speaker 210 via the system bus 110. For example, in an exemplary embodiment, the motherboard 20 may access the wireless memory storage device 204 via the wireless transmission device 207.

Figure 3:
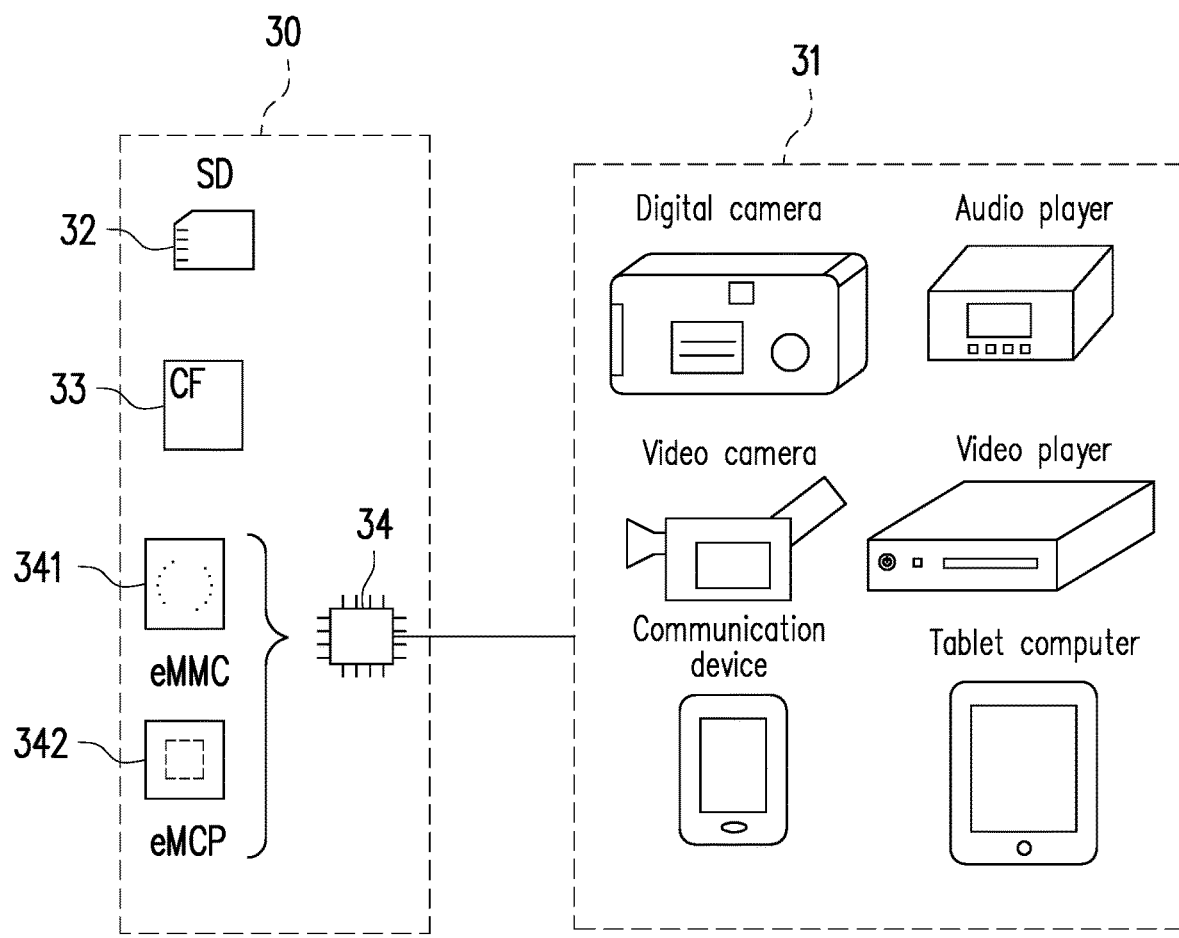
FIG. 3 is a diagram of a host system and a memory storage device shown according to another exemplary embodiment.

In an exemplary embodiment, the mentioned host system is any system that may substantially store data with a memory storage device. Although in the above exemplary embodiments, the host system is exemplified by a computer system, FIG. 3 is a diagram of a host system and a memory storage device shown according to another exemplary embodiment. Referring to FIG. 3, in another exemplary embodiment, a host system 31 may also be a system such as a digital camera, a video camera, a communication device, an audio player, a video player, or a tablet computer, and the memory storage device 30 may be various non-volatile memory storage devices used thereby such as an SD card 32, a CF card 33, or an embedded storage device 34. The embedded storage device 34 includes various types of embedded storage devices for which a memory module is directly coupled on the substrate of the host system, such as an embedded MMC (eMMC) 341, and/or an embedded multi-chip package (eMCP) 342.

Figure 4:
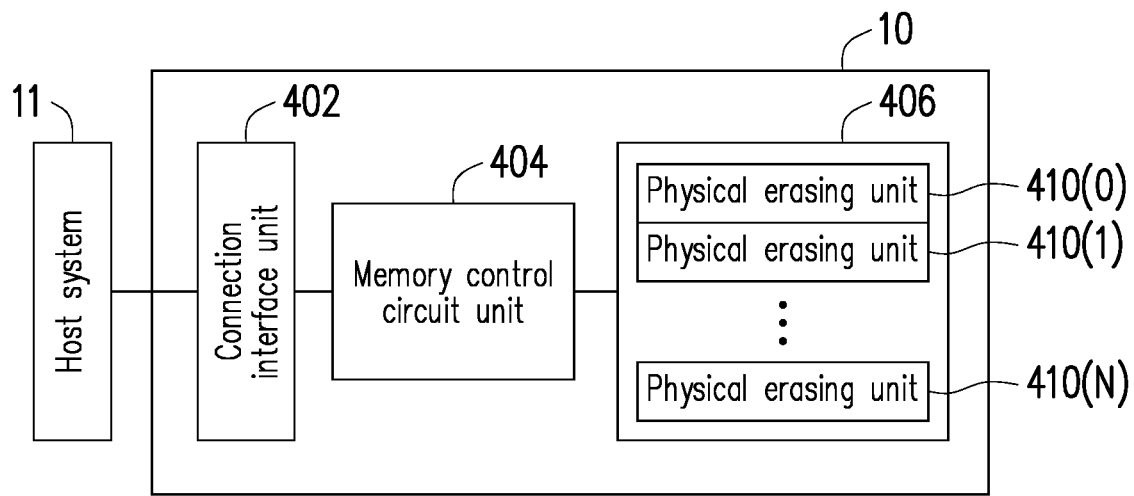
FIG. 4 is a schematic block diagram of a host system and a memory storage device shown according to an exemplary embodiment of the invention.

FIG. 4 is a schematic block diagram of a host system and a memory storage device shown according to an exemplary embodiment of the invention.

Referring to FIG. 4, the memory storage device 10 includes a connection interface unit 402, a memory control circuit unit 404, and a rewritable non-volatile memory module 406.

In the present exemplary embodiment, the connection interface unit 402 is compatible with the Peripheral Component Interconnect Express (PCI Express) standard. However, it should be understood that, the invention is not limited thereto, and the connection interface unit 402 may also satisfy the Serial Advanced Technology Attachment (SATA) standard, parallel advanced technology attachment (PATA) standard, Institute of Electrical and Electronic Engineers (IEEE) 1394 standard, SD interface standard, Universal Serial Bus (USB) standard, Ultra High Speed-I (UHS-I) interface standard, Ultra High Speed-II (UHS-II) interface standard, memory sick (MS) interface standard, multi-chip package interface standard, MMC interface standard, eMMC interface standard, Universal Flash Storage (UFS) interface standard, eMCP interface standard, CF interface standard, integrated device electronics (IDE) interface standard, or other suitable standards. In the present exemplary embodiment, the connection interface unit 402 may be sealed in a chip with the memory control circuit unit 404. Alternatively, the connection interface unit 402 is disposed outside of a chip containing the memory control circuit unit.

The memory control circuit unit 404 is configured to execute a plurality of logic gates or control commands implemented in hardware form or firmware form and perform data operations such as writing, reading, and erasing in the rewritable non-volatile memory module 406 based on the commands of the host system 11.

The rewritable non-volatile memory module 406 is coupled to the memory control circuit unit 404 and configured to store data written by the host system 11. The rewritable non-volatile memory module 406 has physical erasing units 410(0) to 410(N). For example, the physical erasing units 410(0) to 410(N) may belong to the same memory die or different memory dies. Each of the physical erasing units respectively has a plurality of physical programming units, wherein physical programming units belonging to the same physical erasing unit may be independently written and erased at the same time. However, it should be understood that, the invention is not limited thereto. Each of the physical erasing units may be formed by 64 physical programming units, 256 physical programming units, or any other number of physical programming units.

More specifically, the physical erasing unit is the smallest unit of erasing. That is, each of the physical erasing units contains the smallest number of memory cells erased together. The physical programming unit is the smallest unit of programming. That is, the physical programming unit is the smallest unit of data writing. Each of the physical programming units generally includes a data bit area and a redundancy bit area. The data bit area contains a plurality of physical access addresses configured to store user data, and the redundancy bit area is configured to store system data (for example, management data such as control information and error correcting code). In the present exemplary embodiment, the data bit area of each of the physical programming units contains 8 physical access addresses, and the size of one physical access address is 512 bytes. However, in other exemplary embodiments, the data bit area may also contain a greater or lesser number of physical access addresses, and the invention does not limit the size and the number of the physical access addresses. For example, in an exemplary embodiment, the physical erasing units are physical blocks, and the physical programming units are physical pages or physical sectors, but the invention is not limited thereto.

In the present exemplary embodiment, the rewritable non-volatile memory module 406 is a single-level cell (SLC) NAND flash memory module (i.e., a flash memory module for which one memory cell may store 1 data bit). However, the invention is not limited thereto, and the rewritable non-volatile memory module 406 may also be a multi-level cell (MLC) NAND flash memory module (i.e., a flash memory module for which one memory cell may store 2 data bits), a trinary-level cell (TLC) NAND flash memory module (i.e., a flash memory module for which one memory cell may store 3 data bits), or other memory modules having the same characteristics. Specifically, the memory cells on the same word line may form one or a plurality of physical programming units. If each memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming units. Generally, in an MLC NAND-type flash memory, the write speed of the lower physical programming units is greater than the write speed of the upper physical programming units, and/or the reliability of the lower physical programming units is greater than the reliability of the upper physical programming units.

Figure 5:
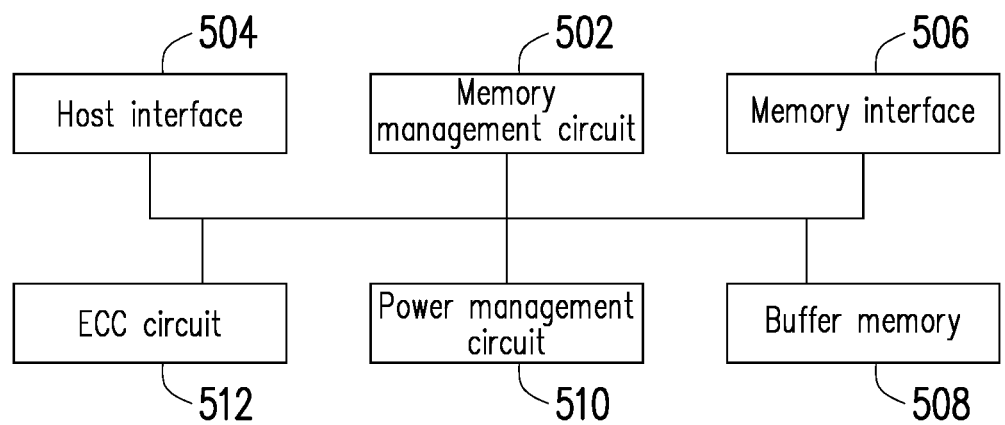
FIG. 5 is a schematic block diagram of a memory control circuit unit shown according to an exemplary embodiment of the invention.

FIG. 5 is a schematic block diagram of a memory control circuit unit shown according to an exemplary embodiment of the invention.

Referring to FIG. 5, the memory control circuit unit 404 includes a memory management circuit 502, a host interface 504, and a memory interface 506.

The memory management circuit 502 is configured to control the overall operation of the memory control circuit unit 404. Specifically, the memory management circuit 502 has a plurality of control commands. During the operation of the memory storage device 10, the control commands are executed to perform operations such as writing, reading, and erasing data.

In the present exemplary embodiment, the control commands of the memory management circuit 502 are implemented in a firmware form. For example, the memory management circuit 502 has a microprocessor unit (not shown) and a read-only memory (not shown), and the control commands are burned into a ROM. During the operation of the memory storage device 10, the control commands are executed by the microprocessor unit to perform operations such as writing, reading, and erasing data.

In another exemplary embodiment of the invention, the control commands of the memory management circuit 502 may also be stored in the form of program codes to a specific area (for example, the system area in a memory module exclusively configured to store system data) of the rewritable non-volatile memory module 406. Moreover, the memory management circuit 502 has a microprocessor unit (not shown), a ROM (not shown), and a RAM (not shown). In particular, the ROM has a boot code, and when the memory control circuit unit 404 is enabled, the microprocessor unit first executes the activation code to load the control commands stored in the rewritable non-volatile memory module 406 into the RAM of the memory management circuit 502. Next, the microprocessor unit runs the control commands to perform operations such as writing, reading, and erasing data.

Further, in another exemplary embodiment of the invention, the control commands of the memory management circuit 502 may also be implemented in a hardware form. For example, the memory management circuit 502 includes a microcontroller, a memory cell management circuit, a memory write circuit, a memory read circuit, a memory erase circuit, and a data processing circuit. The memory cell management circuit, the memory write circuit, the memory read circuit, the memory erase circuit, and the data processing circuit are coupled to the microcontroller. In particular, the memory cell management circuit is configured to manage the physical erasing units of the rewritable non-volatile memory module 406; the memory write circuit is configured to issue a write command to the rewritable non-volatile memory module 406 to write data to the rewritable non-volatile memory module 406; the memory read circuit is configured to issue a read command to the rewritable non-volatile memory module 406 so as to read data from the rewritable non-volatile memory module 406; the memory erase circuit is configured to issue an erase command to the rewritable non-volatile memory module 406 to erase data from the rewritable non-volatile memory module 406; and the data processing circuit is configured to process data to be written to the rewritable non-volatile memory module 406 and read data from the rewritable non-volatile memory module 406.

The host interface 504 is coupled to the memory management circuit 502 and configured to be coupled to the connection interface unit 402 so as to receive and identify commands and data sent by the host system 11. In other words, the commands and the data sent by the host system 11 are sent to the memory management circuit 502 via the host interface 504. In the present exemplary embodiment, the host interface 504 is compatible with the PCI Express standard. However, it should be understood that the invention is not limited thereto, and the host interface 504 may also be compatible with the PATA standard, IEEE 1394 standard, SATA standard, USB standard, UHS-I standard, UHS-II standard, SD standard, MS standard, MMC standard, CF standard, IDE standard, or other suitable data transmission standards.

The memory interface 506 is coupled to the memory management circuit 502 and configured to access the rewritable non-volatile memory module 406. In other words, data to be written to the rewritable non-volatile memory module 406 is converted to a format acceptable to the rewritable non-volatile memory module 406 via the memory interface 506.

A buffer memory 508 is coupled to the memory management circuit 502 and configured to temporarily store data and commands from the host system 11 or data from the rewritable non-volatile memory module 406.

In an exemplary embodiment, the memory control circuit unit 404 further includes the buffer memory 508, a power management circuit 510, and an error checking and correcting (ECC) circuit 512.

The power management circuit 510 is coupled to the memory management circuit 502 and configured to control the power of the memory storage device 10.

The ECC circuit 512 is coupled to the memory management circuit 502 and configured to execute an ECC process to ensure the correctness of data. Specifically, when the memory management circuit 502 receives a write command from the host system 11, the ECC circuit 512 generates an ECC code for the data corresponding to the write command, and the memory management circuit 502 writes the data and ECC code corresponding to the write command to the rewritable non-volatile memory module 406. Next, when reading data from the rewritable non-volatile memory module 406, the memory management circuit 502 also reads the ECC code corresponding to the data, and the ECC circuit 512 performs an ECC process on the read data based on the ECC code.

The operations performed by the memory management circuit 502, the host interface 504 and the memory interface 506, the buffer memory 508, the power management circuit 510, and the ECC circuit 512 are described below, which may also be referred to as being performed by the memory control circuit unit 404.

In an exemplary embodiment, the basic unit of the coding/decoding process performed by the ECC circuit 512 is one frame. One frame includes a plurality of data bits, e.g., 256 bits. However, in different exemplary embodiments, one frame may also include more or less bits.

In the present exemplary embodiment, the ECC circuit 512 may perform single-frame coding and decoding of data stored in the same physical programming unit, and may also perform multi-frame coding and decoding of data stored in a plurality of physical programming units. The single-frame coding and multi-frame coding may respectively adopt at least one of coding algorithms such as low-density parity check code (LDPC code), BCH code, convolutional code, or turbo code. Alternatively, in an exemplary embodiment, the multi-frame coding may also adopt a Reed-Solomon code (RS code) algorithm. Besides, in addition to the above coding algorithms, more coding algorithms not listed above may also be adopted, which is not repeated herein. Based on the adopted coding algorithm, the ECC circuit 512 may encode data to be protected to generate a corresponding ECC code. The type of the ECC code may be a parity checking code, a channel code, or other types. For ease of explanation, in the following, the error checking and correcting code is shortened as error correcting code.

In an exemplary embodiment, the error correcting code includes a Redundant Array of Independent Disks (RAID) error correcting code, which may be referred to as RAID ECC code for short. For example, the memory management circuit 502 may temporarily store the data corresponding to the write command from the host system 11 in the buffer memory 508, and generate a RAID ECC code according to the data. The RAID ECC code is configured to correct a plurality of physical programming units storing data. For example, the memory management circuit 502 performs logic operations on data programmed into different physical programming units to generate a RAID ECC code, and both the data used to generate the RAID ECC code and the RAID ECC code conform to the coding rules of the RAID ECC code. Thus, the RAID ECC code may correct data of two or more physical programming units. The resulting RAID ECC code is also programmed into one physical programming unit. In the present exemplary embodiment, the RAID ECC code is generated by the memory management circuit 502. However, the RAID ECC code may also be generated by the ECC circuit 512, and the invention is not limited thereto.

In an exemplary embodiment, the memory management circuit 502 may manage and access physical nodes in the rewritable non-volatile memory module 406 based on the management units. One management unit is also referred to as one virtual block (VB). One management unit may contain a plurality of physical nodes. For example, one management unit may encompass a plurality of physical nodes belonging to one or a plurality of planes (also referred to as memory planes) and/or one or a plurality of chip enabled (CE) in the rewritable non-volatile memory module 406.

Figure 6:
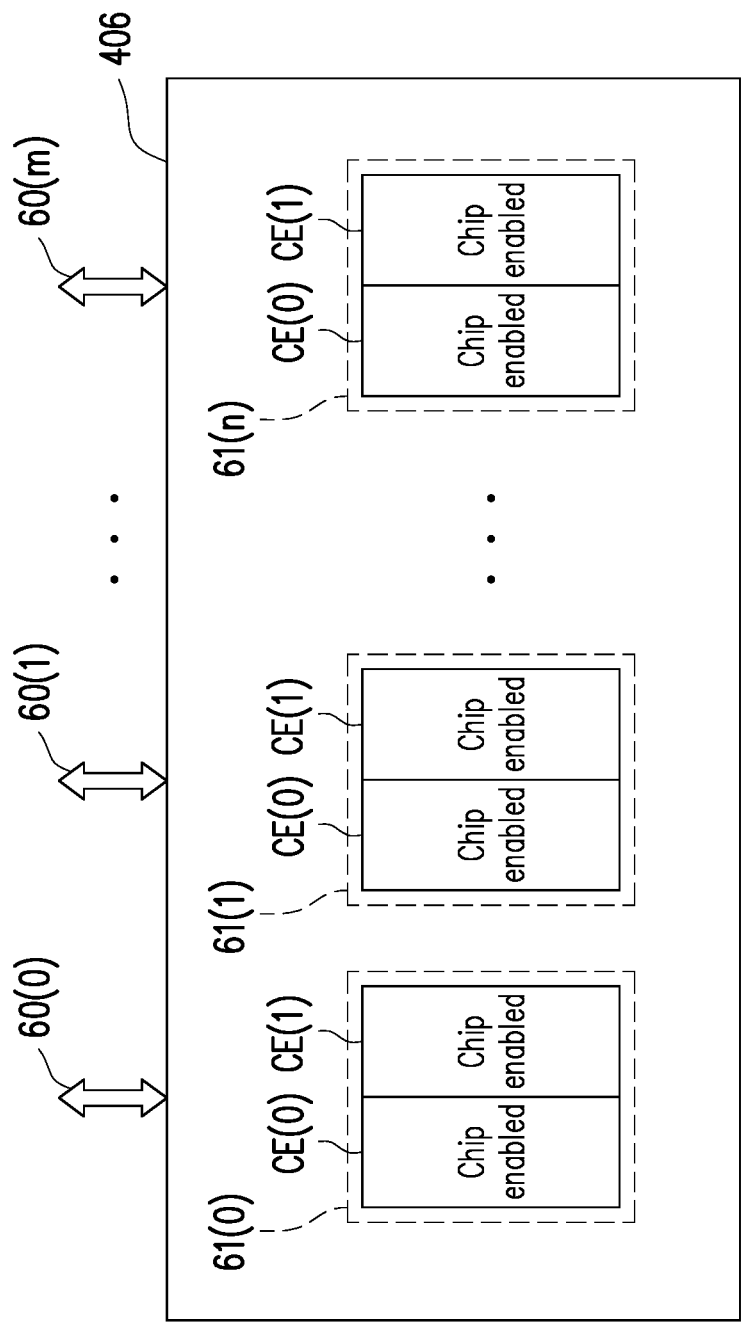
FIG. 6 is a schematic diagram of the management of a rewritable non-volatile memory module shown according to an exemplary embodiment of the invention.

FIG. 6 is a schematic diagram of the management of a rewritable non-volatile memory module shown according to an exemplary embodiment of the invention. Referring to FIG. 6, the rewritable non-volatile memory module 406 includes management units 61(0) to 61(n). Each of the management units 61(0) to 61(n) includes chip enabled (also referred to as chip enabled groups) CE(0) and CE(1). The chip enabled CE(0) and CE(1) respectively include a plurality of physical nodes. The memory management circuit 502 may enable chip enabled separately via a chip enabled pin. The memory management circuit 502 may access the management units 61(0) to 61(n) via channels 60(0) to 60(m). For example, the memory management circuit 502 may access the management units 61(0) and 61(1) in parallel (also referred to as interleaved) via at least two of the channels 60(0) to 60(m). In addition, the chip enabled CE(0) and CE(1) may each include a plurality of planes (for example, first planes PL(1), PL(3), PL(5), and PL(7) and second planes PL(2), PL(4), PL(6), and PL(8) of FIG. 7).

The planes in the management units 61(0) and 61(1) may include a plurality of physical nodes. These physical nodes may be accessed in parallel (or interleaved) to improve access efficiency. In an exemplary embodiment, a plurality of consecutive physical nodes in one plane may be referred to as one physical programming unit. Or, in an exemplary embodiment, a plurality of consecutive physical nodes in one chip enabled may be referred to as one physical programming unit. Or, in an exemplary embodiment, a plurality of consecutive physical nodes in a plurality of planes may be referred to as one physical programming unit.

The memory management circuit 502 may also combine several physical erasing units belonging to different memory planes into one super-physical unit (also known as a super-physical erasing unit) to perform operations (for example, data write operations, data erase operations). One super-physical unit includes at least two available physical erasing units among all physical erasing units. In the present exemplary embodiment, at least two available physical erasing units included in one super-physical unit belong to different operation units (e.g., planes, interleaves, or channels). Therefore, different physical programming units in the super-physical programming units included in the super-physical unit may be programmed simultaneously according to the same write command.

Figure 7:
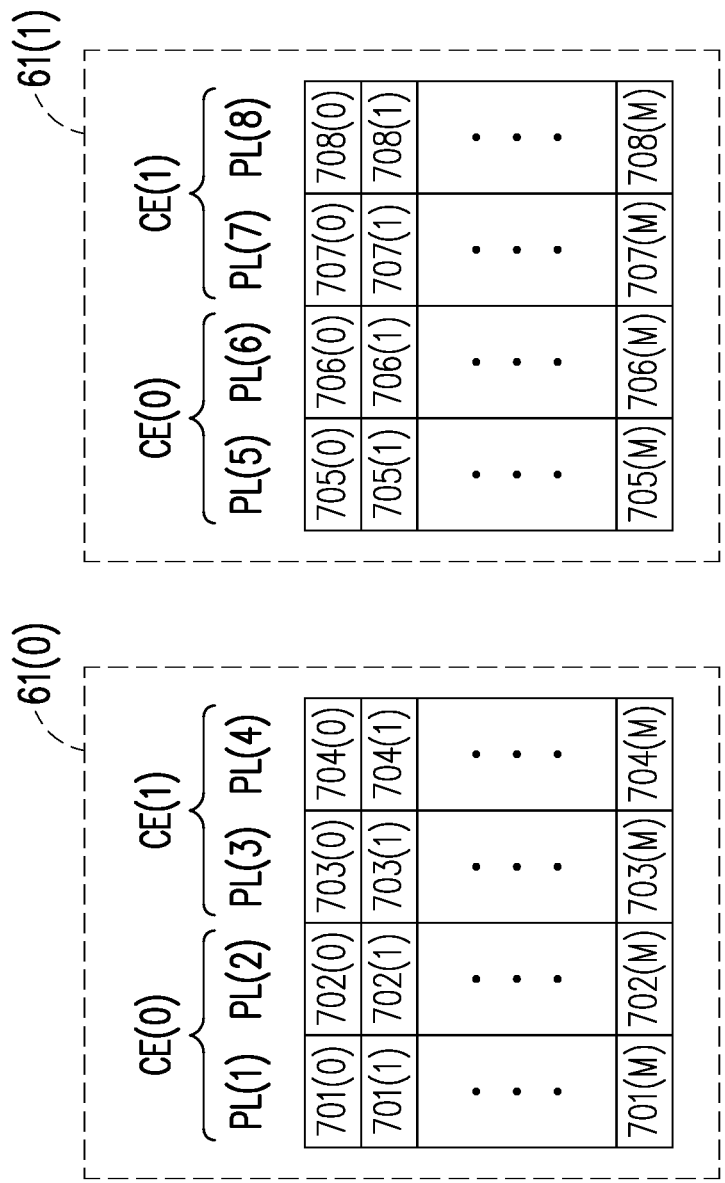
FIG. 7 is a schematic diagram of management units shown according to an exemplary embodiment of the invention.

FIG. 7 is a schematic diagram of management units shown according to an exemplary embodiment of the invention. Referring to FIG. 7, taking the management units 61(0) and 61(1) as an example, the first planes PL(1), PL(3), PL(5), PL(7) and the second planes PL(2), PL(4), PL(6), PL(8) may include a plurality of physical nodes. The management unit 61(0) includes the chip enabled CE(0) and CE(1), and the first planes PL(1), PL(3) and the second planes PL(2), PL(4) in the chip enabled CE(0) and CE(1) respectively include physical programming units 701(0) to 701(M), 702(0) to 702(M), 703(0) to 703(M), and 704(0) to 704(M). The management unit 61(1) includes the chip enabled CE(0) and CE(1), and the first planes PL(5), PL(7) and the second planes PL(6), PL(8) in the chip enabled CE(0) and CE(1) respectively include physical programming units 705(0) to 705(M), 706(0) to 706(M), 707(0) to 707(M), and 708(0) to 708(M). In the present exemplary embodiment, the physical programming units 701(0) to 708(0), 701(1) to 708(1), and 701(M) to 708(M) may be configured as super-physical programming units, respectively.

In the present exemplary embodiment, the memory management circuit 502 may write data to a plurality of physical programming units according to the programming sequence of the planes PL(1) to PL(8). Assuming that all physical programming units are blank, in order to write a write data that may fill up 14 physical programming units, the memory management circuit 502 starts from the first blank physical programming unit (e.g., the physical programming unit 701(0)) according to a programming sequence to program write data to physical programming units (e.g., the physical programming units 701(0), 702(0), 703(0), 704(0), 705(0), 706(0), 707(0), 708(0), 701(1), 702(1), 703(1), 704(1), 705(1), 706(1) program write data to physical programming units in a programming sequence), and so on. In another embodiment, the memory management circuit 502 may program data into a single (or more) management unit, for example, may program data into a plurality of physical programming units according to the programming sequence of the planes PL(1) to PL(4), and the invention is not limited thereto.

FIG. 8 is a schematic diagram of data writing shown according to an exemplary embodiment of the invention. For simplicity, the reference numeral corresponding to each physical programming unit is not directly shown here. Please compare the physical programming units in FIG. 7 and the reference numerals of the physical programming units on the left in FIG. 8 at the same time. In the exemplary embodiment of FIG. 8, for ease of explanation, assuming one super-physical unit consists of 48 physical programming units, the physical programming units 701(0) to 708(0), 701(1) to 708(1), 701(2) to 708(2), 701(3) to 708(3), 701(4) to 708(4), and 701(5) to 708(5) may be configured as a super-physical unit 810. That is, each of the super-physical units includes a plurality of physical programming units belonging to different operation units (e.g., planes, interleaves, or channels). It should be noted that, in different exemplary embodiments, one super-physical unit may also include more or less physical programming units.

In the present exemplary embodiment, when a write command is received from the host system 11, the memory management circuit 502 may store data corresponding to the write command to a plurality of physical programming units. For example, data D0 to D13 are respectively stored in the physical programming units 701(0), 702(0), 703(0), 704(0), 705(0), 706(0), 707(0), 708(0), 701(1), 702(1), 703(1), 704(1), 705(1), and 706(1). After performing multi-frame coding on the data D0 to D13, RAID ECC codes P0 and P1 are generated and stored in the physical programming units 707(1) and 708(1). In other words, the RAID ECC codes P0 and P1 may be regarded as the RAID ECC codes corresponding to the data D0 to D13, and the RAID ECC codes P0 and P1 are generated by encoding the data D0 to D13 based on the coding rules of the RAID ECC code. In the present exemplary embodiment, the data D0 to D13 may be regarded with the RAID ECC codes P0 and P1 as one block code with the RAID ECC codes as the protection unit.

It should be noted that an abnormal power loss may occur during the operation of the host system 11, thus causing the memory storage device 10 to suddenly power-off when the data is half-written. If an abnormal power loss occurs, the written data may not be completely stored in the rewritable non-volatile memory module 406, and the written data may be interrupted on any physical programming unit.

FIG. 9 is a schematic diagram of data writing shown according to an exemplary embodiment of the invention. Continuing with FIG. 8, it is assumed that the memory management circuit 502 continues to store data to the physical programming units included in the super-physical unit 810 according to the write command. For example, data D14 to D17 are stored in the physical programming units 701(2), 702(2), 703(2), and 704(2), respectively. If the memory storage device 10 is powered off while writing the data D17 to the physical programming unit 704(2), the data writing operation is interrupted. At this time, the data D14 to D17 not protected by RAID ECC codes are not able to be corrected when there is an error in the data.

In an exemplary embodiment, when the memory storage device 10 is powered on again, the memory management circuit 502 may determine whether the power loss state of the memory storage device 10 is an abnormal power loss state. For example, the memory management circuit 502 may determine whether the memory storage device 10 is powered off normally or abnormally according to the power-off command. Specifically, when the system is powered off normally, the memory storage device 10 receives a power-off command from the host system 11. Here, if the memory storage device 10 is powered on again after being powered off, the memory management circuit 502 does not detect the power-off command, and it may be determined that the memory storage device 10 is in an abnormal power loss state due to abnormal power loss when the power is off. If the memory storage device 10 is powered on again after being powered off, the memory management circuit 502 detects the power-off command, and it may be determined that the memory storage device 10 is in a normal power loss state due to normal power loss when the power is off.

In an exemplary embodiment, if the memory storage device 10 is powered off abnormally, the memory management circuit 502 performs a sudden power-off recovery (SPOR) operation. When performing a SPOR operation, the memory management circuit 502 may scan a specific super-physical unit (also referred to as a first super-physical unit) to obtain the amount of written data of the super-physical unit. In particular, the super-physical unit as the first super-physical unit is the last super-physical unit to which data is written before the abnormal power loss occurs.

In the present exemplary embodiment, the memory management circuit 502 determines whether the resulting amount of written data is greater than a threshold value (also referred to as a first threshold value). The memory management circuit 502 may determine the first threshold value according to the capacity of the super-physical unit. For example, the capacity of the super-physical unit may be calculated according to the capacity of each of the physical programming units in the super-physical unit and the number of physical programming units. In particular, the first threshold value may be set to ⅓ of the capacity of the super-physical unit according to requirements, or may also be set to ½ of the capacity of the super-physical unit, and the invention is not limited thereto.

With the advancement of technology, one super-physical unit is configured to include an increasing number of physical programming units, even increasing from more than 100 physical programming units to more than 3000 physical programming units. If data is written to a position close to the last physical programming unit in the super-physical unit during abnormal power loss, the amount of data to be copied is very large. This makes the copy time very long, thus affecting the boot time of the host system 11. Therefore, in an exemplary embodiment, in response to the amount of written data being greater than the first threshold value, the memory management circuit 502 reads the data stored in the first super-physical unit without the corresponding RAID ECC code to obtain the data (also referred to as first data), and copies the read first data to another super-physical unit (also referred to as a second super-physical unit). In particular, the data does not have the corresponding RAID ECC code, indicating the data is not protected by the RAID ECC code.

For example, referring to FIG. 9, it is assumed that the first threshold value is ⅓ of the capacity of the super-physical unit. When the memory storage device 10 is abnormally powered off and powered on again, the amount of data written of the super-physical unit 810 is greater than the first threshold value. The memory management circuit 502 may copy the data D14 to D17 in the super-physical unit 810 without corresponding RAID ECC codes to another super-physical unit. It should be mentioned that, in the present exemplary embodiment, when performing a power loss recovery operation, the memory management circuit 502 does not read the data stored in the first super-physical unit with the corresponding RAID ECC code, but instead only copies the data stored in the first super-physical unit without the corresponding RAID ECC code to another super-physical unit.

After copying the first data to the second super-physical unit, the memory management circuit 502 may update the mapping information between the logical address corresponding to the first data and the physical programming units included in the second super-physical unit in a logical-to-physical mapping table. Moreover, when the memory storage device 10 receives the write command from the host system 11, the memory management circuit 502 may write the data instructed by the write command to the second super-physical unit following the first data.

For example, referring to FIG. 9, it is assumed that the first threshold value is ⅓ of the capacity of the super-physical unit. When the memory storage device 10 is abnormally powered off and powered on again, the amount of data written of the super-physical unit 810 is greater than the first threshold value. The memory management circuit 502 may copy the data D14 to D17 in the super-physical unit 810 without the corresponding RAID ECC codes and the block codes (including the data D0 to D13 and the RAID ECC codes P0 and P1) written in the last group with the RAID ECC codes as the protection unit in the super-physical unit 810 to another super-physical unit.

In an exemplary embodiment, the physical programming units included in the last super-physical unit to which data is written before the abnormal power loss occurs is more unstable. If the amount of written data is less and does not exceed a certain amount of data, all data stored in a super-physical unit may be copied to another super-physical unit to maintain the stability of the stored data. Therefore, in response to the amount of written data not being greater than the first threshold value, the memory management circuit 502 may read all the data stored in the first super-physical unit to obtain the data (also referred to as second data), and copy the read second data to another super-physical unit (also referred to as a second super-physical unit). In the present exemplary embodiment, after copying the second data to the second super-physical unit, the memory management circuit 502 may update the mapping information between the logical address corresponding to the second data and the physical programming units included in the second super-physical unit in the logical-to-physical mapping table, and erase the data in the first super-physical unit.

It should be mentioned that, the memory management circuit 502 may also directly read the data stored in the first super-physical unit without the corresponding RAID ECC code without scanning to obtain the first data and copy the first data to the second super-physical unit when the memory storage device 10 is powered on again and detected as an abnormal power loss.

In an exemplary embodiment, the memory management circuit 502 may further determine the type of the first super-physical unit to determine whether to copy the data stored in the first super-physical unit. Specifically, when performing a power loss recovery operation, the memory management circuit 502 may obtain the type of the first super-physical unit. This type includes a first type super-physical unit and a second type super-physical unit. The first type physical unit refers to the super-physical unit currently serving as an open unit (also referred to as an open block). Once a certain super-physical unit that is an open unit is full (for example, all physical programming units in this super-physical unit are programmed and are in a programmed state), this super-physical unit may then become a shutdown unit (also known as a shutdown block). In an exemplary embodiment, the second type physical unit refers to a super-physical unit that is currently a shutdown unit.

In the present exemplary embodiment, the memory management circuit 502 may determine that the first super-physical unit is the first type physical unit or the second type physical unit. In response to the first super-physical unit being the second type physical unit, the memory management circuit 502 does not copy the data stored in the first super-physical unit. In response to the first super-physical unit being the first type physical unit, the memory management circuit 502 copies the data stored in the first super-physical unit to the second super-physical unit. For example, the memory management circuit 502 may copy all or a portion of the data stored in the first super-physical unit to the second super-physical unit. For the specific content of copying data and how to decide to copy all or a portion of the data, reference may be made to the descriptions in the above exemplary embodiments, and is not repeated herein.

In an exemplary embodiment, the memory management circuit 502 may determine whether the type of the first super-physical unit is the first type physical unit or the second type physical unit according to the total number of physical programming units in the erased state (or programmed state) in the first super-physical unit. For example, in response to the fact that the total number of physical programming units in the erased state in the first super-physical unit is not zero, the memory management circuit 502 may determine that the first super-physical unit is the first type physical unit. Moreover, in response to the fact that the total number of physical programming units in the erased state in the first super-physical unit is zero, the memory management circuit 502 may determine that the first super-physical unit is the second type physical unit.

Moreover, it should be mentioned that, in the present exemplary embodiment, after the power loss recovery operation is performed and the memory storage device 10 starts to operate normally, in order to increase management efficiency, the first type physical unit may be further processed. In an exemplary embodiment, the memory management circuit 502 may determine whether the idle time elapsed from the last writing to the present in the rewritable non-volatile memory module 406 including the plurality of super-physical units is greater than a predetermined time. When the idle time is not greater than the predetermined time, the usage time is further accumulated. In response to the idle time being greater than the predetermined time, the memory management circuit 502 performs a data sorting operation. When performing the data sorting operation, the memory management circuit 502 may read data other than the first data in the first super-physical unit to obtain third data, and copy the third data to another super-physical unit (also known as a third super-physical unit). After copying the third data to the third super-physical unit, the memory management circuit 502 may update the mapping information between the logical address corresponding to the third data and the physical programming units included in the third super-physical unit in the logical-to-physical mapping table, and erase the data in the first super-physical unit.

Specifically, the memory management circuit 502 copies the first data stored in the first super-physical unit without the corresponding RAID ECC code to the second super-physical unit when performing the power loss recovery operation, and after being idle for a period of time, in the present exemplary embodiment, the remaining third data other than the first data may be copied to a third super-physical unit. The third super-physical unit may be the same as the second super-physical unit according to the operation, and the invention is not limited thereto. In this way, the memory storage device 10 may maintain the second type physical unit in the rewritable non-volatile memory module 406, which is easier to manage than the first type physical unit.

Figure 10:
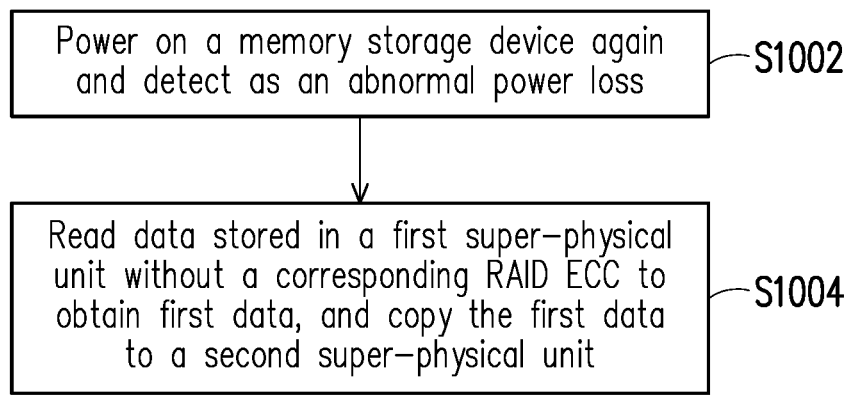
FIG. 10 to FIG. 12 are flowcharts of an abnormal power loss recovery method shown according to an exemplary embodiment.

FIG. 10 is a flowchart of an abnormal power loss recovery method shown according to an exemplary embodiment. In step S1002, a memory storage device is powered on again and detected as an abnormal power loss. In step S1004, data stored in a first super-physical unit without a corresponding RAID ECC code is read to obtain first data, and the first data is copied to a second super-physical unit.

Figure 11:
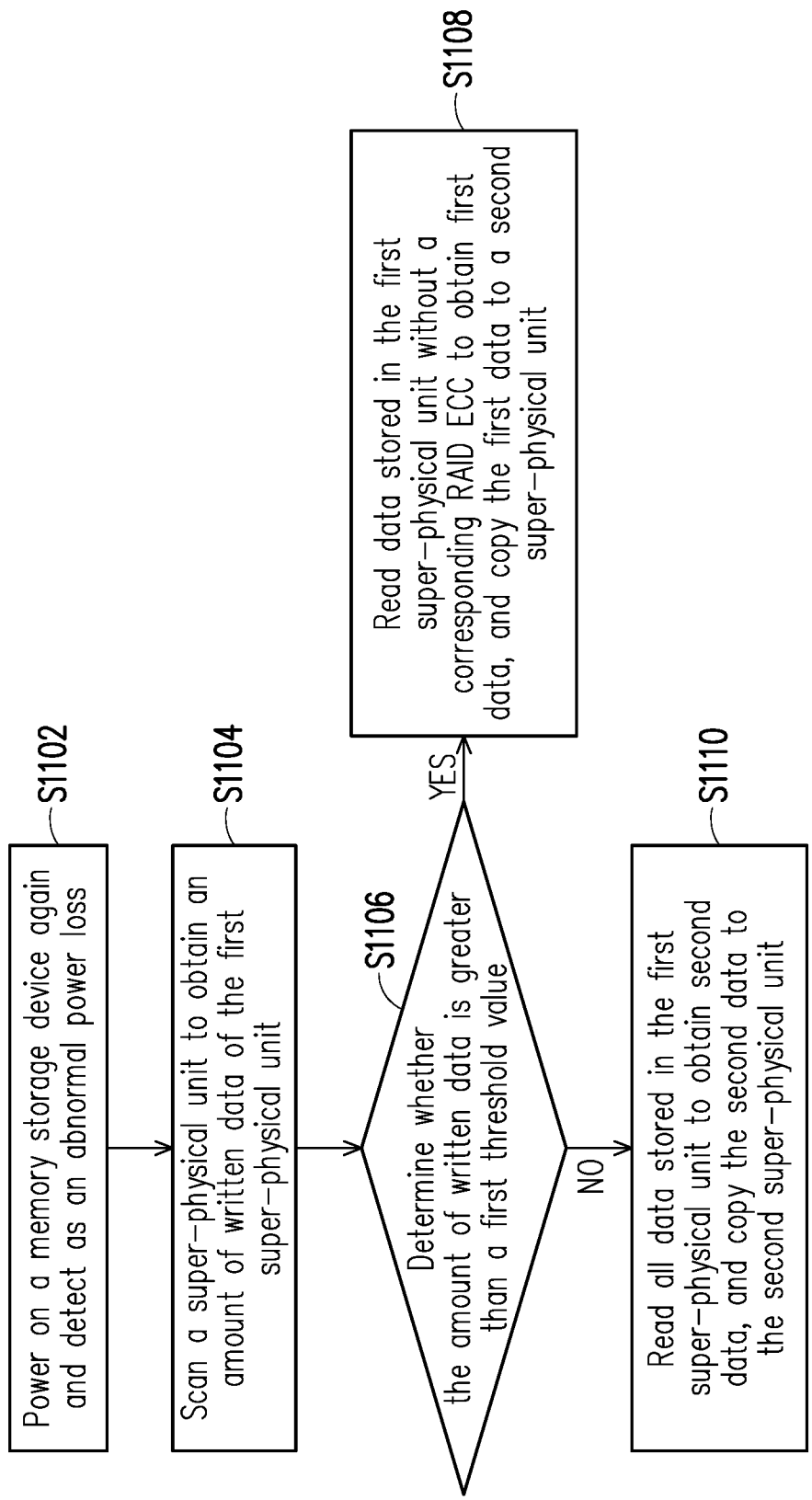

FIG. 11 is a flowchart of an abnormal power loss recovery method shown according to an exemplary embodiment. In step S1102, a memory storage device is powered on again and detected as an abnormal power loss. In step S1104, a first super-physical unit is scanned to obtain an amount of written data of the first super-physical unit. In step S1106, whether the amount of written data is greater than a first threshold value is determined. If it is determined that the amount of written data is greater than the first threshold value (that is, the determination in step S1106 is "Yes"), in step S1108, data stored in the first super-physical unit without a corresponding RAID ECC code is read to obtain first data, and the first data is copied to a second super-physical unit. If it is determined that the amount of written data is not greater than the first threshold value (that is, the determination in step S1106 is "No"), in step S1110, all data stored in the first super-physical unit is read to obtain second data, and the second data is copied to the second super-physical unit.

Figure 12:
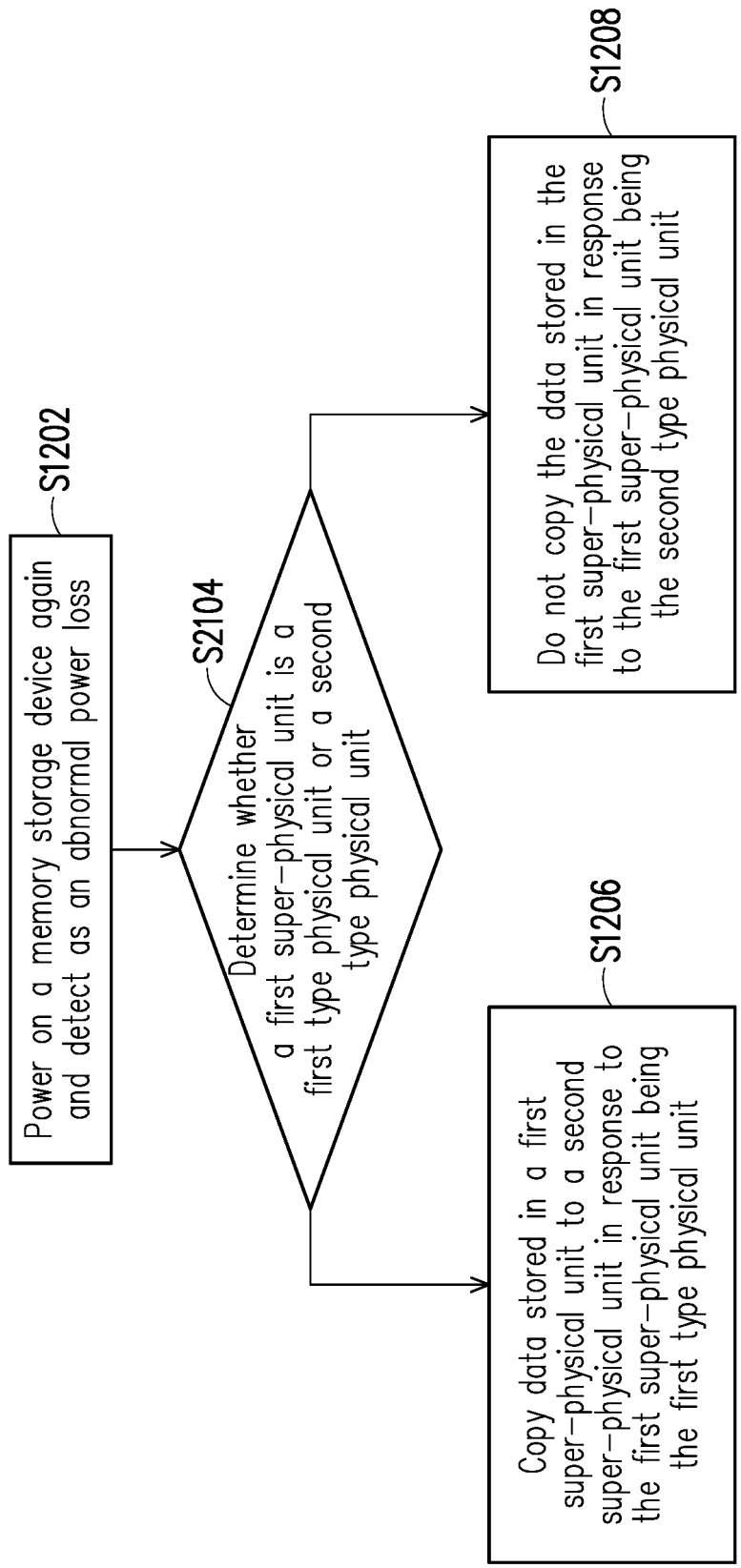

FIG. 12 is a flowchart of an abnormal power loss recovery method shown according to an exemplary embodiment. In step S1202, a memory storage device is powered on again and detected as an abnormal power loss. In step S1204, a first super-physical unit is determined as a first type physical unit or a second type physical unit. In step S1206, in response to the first super-physical unit being the first type physical unit, data stored in a first super-physical unit is copied to a second super-physical unit. In step S1208, in response to the first super-physical unit being the second type physical unit, the data stored in the first super-physical unit is not copied.

However, each step in FIG. 10 to FIG. 12 is as described in detail above, and is not repeated herein. It should be mentioned that, each step in FIG. 10 to FIG. 12 may be implemented as a plurality of program codes or circuits, and the invention is not limited thereto. Moreover, the method of FIG. 10 to FIG. 12 may be used with the above exemplary embodiments, and may also be used alone, and the invention is not limited thereto.

Based on the above, in the abnormal power loss recovery method, the memory control circuit unit, and the memory storage device provided by the embodiments of the invention, all or a portion of the data of the super-physical unit may be copied to another super-physical unit according to the characteristics of the super-physical unit when the power is turned off abnormally and then turned back on again. For example, the unstable data stored in the super-physical unit without the corresponding RAID ECC code is copied to another super-physical unit for storage. Thereby, the recovery time of abnormal power loss may be effectively reduced, and the operation efficiency of the memory storage device may be improved.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. An abnormal power loss recovery method, configured for a memory storage device comprising a rewritable non-volatile memory module, wherein the rewritable non-volatile memory module comprises a plurality of super-physical units, the super-physical units comprise at least two physical erasing units, the at least two physical erasing units belong to different operation units and each of the physical erasing units comprises a plurality of physical programming units, and the abnormal power loss recovery method comprises:
   reading data stored in a first super-physical unit without a corresponding RAID ECC code when the memory storage device is powered on again and detected as an abnormal power loss to obtain first data,
   wherein the first super-physical unit is a last super-physical unit to which data is written before the abnormal power loss occurs; and
   copying the first data to a second super-physical unit,
   wherein before reading the data stored in the first super-physical unit without the corresponding RAID ECC code to obtain the first data, the method further comprises: scanning the first super-physical unit to obtain an amount of written data of the first super-physical unit when the memory storage device is powered on again and detected as the abnormal power loss; determining whether the amount of written data is greater than a first threshold value; and reading all data stored in the first super-physical unit to obtain second data, and copying the second data to the second super-physical unit in response to the amount of written data not being greater than the first threshold value.

2. The abnormal power loss recovery method of claim 1, further comprises:
   obtaining the first data and copying the first data to the second super-physical unit in response to the amount of written data being greater than the first threshold value.

3. The abnormal power loss recovery method of claim 2, wherein the first threshold value is determined according to a capacity of the first super-physical unit.

4. The abnormal power loss recovery method of claim 2, wherein the first threshold value is ⅓ of a capacity of the first super-physical unit.

5. The abnormal power loss recovery method of claim 1, wherein after copying the first data to the second super-physical unit, the method further comprises:
   receiving a write command from a host system, and writing data instructed by the write command to the second super-physical unit following the first data.

6. The abnormal power loss recovery method of claim 1, wherein after copying the first data to the second super-physical unit, the method further comprises:
   determining whether an idle time elapsed from a last writing to a present in the plurality of super-physical units is greater than a predetermined time; and
   reading data other than the first data in the first super-physical unit to obtain third data and copying the third data to a third super-physical unit in response to the idle time being greater than the predetermined time.

7. The abnormal power loss recovery method of claim 1, wherein the method further comprises:
   determining that the first super-physical unit is a first type physical unit or a second type physical unit;
   reading the first data and copying the first data to the second super-physical unit in response to the first super-physical unit being the first type physical unit; and
   not copying data stored in the first super-physical unit in response to the second super-physical unit being the second type physical unit.

8. The abnormal power loss recovery method of claim 7, wherein a first total number of physical programming units in an erased state in the first type physical unit is different from a second total number of physical programming units in the erased state in the second type physical unit.

9. The abnormal power loss recovery method of claim 8, wherein the first total number is not zero, and the second total number is zero.

10. A memory control circuit unit, configured to control a memory storage device, wherein the memory storage device comprises a rewritable non-volatile memory module, and the memory control circuit unit comprises:
    a host interface configured to be coupled to a host system;
    a memory interface configured to be coupled to the rewritable non-volatile memory module, wherein the rewritable non-volatile memory module comprises a plurality of super-physical units, the super-physical units comprise at least two physical erasing units, and the at least two physical erasing units belong to different operation units and each of the physical erasing units comprises a plurality of physical programming units; and
    a memory management circuit coupled to the host interface and the memory interface,
    wherein the memory management circuit is further configured to read data stored in a first super-physical unit without a corresponding RAID ECC code when the memory storage device is powered on again and detected as an abnormal power loss to obtain first data,
    wherein the first super-physical unit is a last super-physical unit to which data is written before the abnormal power loss occurs, and
    the memory management circuit is further configured to copy the first data to a second super-physical unit,
    wherein before the operation of reading the data stored in the first super-physical unit without the corresponding RAID ECC code to obtain the first data, the memory management circuit is further configured to: scan the first super-physical unit to obtain an amount of written data of the first super-physical unit when the memory storage device is powered on again and detected as the abnormal power loss; determine whether the amount of written data is greater than a first threshold value; and read all data stored in the first super-physical unit to obtain second data, and copy the second data to the second super-physical unit in response to the amount of written data not being greater than the first threshold value.

11. The memory control circuit unit of claim 10, wherein the memory management circuit is further configured to:
obtain the first data and copy the first data to the second super-physical unit in response to the amount of written data being greater than the first threshold value.

12. The memory control circuit unit of claim 11, wherein the first threshold value is determined according to a capacity of the first super-physical unit.

13. The memory control circuit unit of claim 11, wherein the first threshold value is ⅓ of a capacity of the first super-physical unit.

14. The memory control circuit unit of claim 10, wherein after the operation of copying the first data to the second super-physical unit, the memory management circuit is further configured to receive a write command from the host system and write data indicated by the write command to the second super-physical unit following the first data.

15. The memory control circuit unit of claim 10, wherein after the operation of copying the first data to the second super-physical unit, the memory management circuit is further configured to determine whether an idle time elapsed from a last writing to a present in the plurality of super-physical units is greater than a predetermined time, and
the memory management circuit is further configured to read data other than the first data in the first super-physical unit to obtain third data and copy the third data to a third super-physical unit in response to the idle time being greater than the predetermined time.

16. The memory control circuit unit of claim 10, wherein the memory management circuit is further configured to determine whether the first super-physical unit is a first type physical unit or a second type physical unit,
the memory management circuit is further configured to read the first data and copy the first data to the second super-physical unit in response to the first super-physical unit being the first type physical unit, and
the memory management circuit is further configured to not copy data stored in the first super-physical unit in response to the second super-physical unit being the second type physical unit.

17. The memory control circuit unit of claim 16, wherein a first total number of physical programming units in an erased state in the first type physical unit is different from a second total number of physical programming units in the erased state in the second type physical unit.

18. The memory control circuit unit of claim 17, wherein the first total number is not zero, and the second total number is zero.

19. A memory storage device, comprising:
a connection interface unit configured to be coupled to a host system;
a rewritable non-volatile memory module, wherein the rewritable non-volatile memory module comprises a plurality of super-physical units, the super-physical units comprise at least two physical erasing units, and the at least two physical erasing units belong to different operation units and each of the physical erasing units comprises a plurality of physical programming units; and
a memory control circuit unit coupled to the connection interface unit and the rewritable non-volatile memory module,
wherein the memory control circuit unit is further configured to read data stored in a first super-physical unit without a corresponding RAID ECC code when the memory storage device is powered on again and detected as an abnormal power loss to obtain first data,
wherein the first super-physical unit is a last super-physical unit to which data is written before the abnormal power loss occurs, and
the memory control circuit unit is further configured to copy the first data to a second super-physical unit,
wherein before the operation of reading the data stored in the first super-physical unit without the corresponding RAID ECC code to obtain the first data, the memory control circuit unit is further configured to: scan the first super-physical unit to obtain an amount of written data of the first super-physical unit when the memory storage device is powered on again and detected as the abnormal power loss; determine whether the amount of written data is greater than a first threshold value; and read all data stored in the first super-physical unit to obtain second data, and copy the second data to the second super-physical unit in response to the amount of written data not being greater than the first threshold value.

20. The memory storage device of claim 19, wherein the memory control circuit unit is further configured to:
obtain the first data and copy the first data to the second super-physical unit in response to the amount of written data being greater than the first threshold value.

21. The memory storage device of claim 20, wherein the first threshold value is determined according to a capacity of the first super-physical unit.

22. The memory storage device of claim 20, wherein the first threshold value is ⅓ of a capacity of the first super-physical unit.

23. The memory storage device of claim 19, wherein after the operation of copying the first data to the second super-physical unit, the memory control circuit unit is further configured to receive a write command from the host system and write data indicated by the write command to the second super-physical unit following the first data.

24. The memory storage device of claim 19, wherein after the operation of copying the first data to the second super-physical unit, the memory control circuit unit is further configured to determine whether an idle time elapsed from a last writing to a present in the plurality of super-physical units is greater than a predetermined time, and
the memory control circuit unit is further configured to read data other than the first data in the first super-physical unit to obtain third data and copy the third data to a third super-physical unit in response to the idle time being greater than the predetermined time.

25. The memory storage device of claim 19, wherein the memory control circuit unit is further configured to determine whether the first super-physical unit is a first type physical unit or a second type physical unit,
the memory control circuit unit is further configured to read the first data and copy the first data to the second super-physical unit in response to the first super-physical unit being the first type physical unit, and the memory control circuit unit is further configured to not copy data stored in the first super-physical unit in response to the second super-physical unit being the second type physical unit.

26. The memory storage device of claim 25, wherein a first total number of physical programming units in an erased state in the first type physical unit is different from a second total number of physical programming units in the erased state in the second type physical unit.

27. The memory storage device of claim 26, wherein the first total number is not zero, and the second total number is zero.

* * * * *